Jan. 19, 1965  H. E. HARING ETAL  3,166,693
DRY ELECTROLYTIC DEVICE
Filed April 2, 1953

INVENTORS: H. E. HARING
R. L. TAYLOR
BY
ATTORNEY

United States Patent Office 3,166,693
Patented Jan. 19, 1965

3,166,693
DRY ELECTROLYTIC DEVICE
Horace E. Haring, Summit, and Raymond L. Taylor, Berkeley Heights, N.J., assignors to Bell Telephone Laboratories, Incorporated, New York, N.Y., a corporation of New York
Filed Apr. 2, 1953, Ser. No. 346,416
6 Claims. (Cl. 317—230)

This invention relates to electrical capacitors and, more particularly, to such devices employing anodically filmed electrodes and to methods of manufacturing such devices.

Electrolytic capacitors have long utilized the advantageous electric and physical properties of the dielectric film of minute and controllable thickness which may be formed upon the surface of certain metals. Examples of these metals include tantalum, aluminum, tungsten, columbium, hafnium, titanium, and zirconium which, therefore, have been termed "film forming" metals. The dielectric or barrier film is formed on the surface of such metals by causing an electrical current to flow from an electrode of such a metal, which is made positive or anode, to another electrode, both immersed in an oxygen supplying ionizable solution known as the electrolyte. Conventional electrolytic capacitors are made up of a filmed anode, a liquid or paste electrolyte, and a cathode, which may be the enclosing can of the capacitor.

Certain disadvantages arise in the conventional electrolytic capacitor due to the presence of the liquid or a liquid carrying paste. Physically, an electrolyte impervious container is a necessity. Furthermore, some type of seal around terminals emerging from the interior of the capacitor is necessary to avoid the loss of the electrolyte. The elements of an impervious container and liquid seals needlessly increase the capacitor volume. The presence of a liquid electrolyte has marked detrimental effects upon the electrical characteristics of such capacitors also. An increase in viscosity, or freezing of the electrolyte, results in a marked decrease in capacitance coupled with a rapid rise in the series resistance of the capacitor.

In the past, some attempts have been made to eliminate the liquid electrolyte from such devices by placing the cathodic element directly in contact with a filmed anode. These attempts have met with failure because minute imperfections in the film are inevitable and these result in direct shorts between the electrodes. The shorts are permanent rendering the device useless for there is no electrolyte present to heal and maintain the barrier film.

It is an object of this invention to improve electrical capacitors employing anodically filmed electrodes. A more specific object is to utilize to the fullest extent possible the volumetric advantages of such electrodes.

Another object of this invention is to enable utilization of essentially only inorganic stable materials to realize a solid dry electrolytic capacitor.

A further object of this invention is to achieve in such a device, a capacitor having substantially uniform electrical characteristics in a range of temperature from approximately $-80°$ C. to $+80°$ C. or higher.

And another object of this invention is to simplify and facilitate the manufacture of electrolytic capacitors.

Still another object of this invention is to realize a method of insuring the formation of a substantially impervious dielectric film between capacitor electrodes.

In one embodiment of this invention, the anode of the capacitor comprises a porous body of compressed particles of a film forming metal. The entire surface of the porous body including the internal pores is covered with an electrolytically formed oxide film. The filmed porous electrode is impregnated with a semiconductive material constituting a solid electrolyte in intimate contact with the anodic film. The terms solid or dry are used herein to indicate the substantially complete absence of any liquid.

The semiconductive layer is coated with a conducting deposit such as graphite and the assembly sheathed with a covering, as by spraying, evaporating or melting on metal suitable for the attachment of a cathode lead, for example a copper wire.

Solid electrolytic capacitors are manufactured in accordance with this invention by compressing particles of a film forming metal into a porous body. The porous body may include a short length of solid lead of the same metal to which a flexible lead is attached. The porous electrode is suspended in a liquid electrolyte which permeates the entire porous body, and then is made anode forming a barrier over the entire surface of the body, including the internal surface of the pores. The filmed electrode is then removed from the liquid electrolyte and impregnated with a semiconductive material by dipping it in a solution which is pyrolytically convertible to a semiconductive oxide in intimate contact with the anodic film. Following impregnation the assembly is subjected again to anodizing in a liquid electrolyte to heal or eliminate any imperfections in the barrier film. The assembly is then removed from the electrolyte and further impregnated with the semiconductive oxide. A conducting deposit is formed over the semiconductive layer to which a cathode lead may be attached by impregnating the assembly with a conducting dispersion such as graphite in water, driving off the water. The outer surface of the carbon coated assembly in turn may be coated with a metal. Suitable leads to the external metallic coating and the porous body complete the electrical connections to the capacitor.

It is a feature of this invention that the essential constituents of the capacitor are all dry inorganic stable materials.

Another feature of this invention is that a film forming semiconductor is in intimate contact with an anodically filmed electrode.

It is also a feature of this invention that the anodic film is formed in a fused salt bath which is maintained at a temperature low enough to insure the formation of a substantially impervious dielectric film.

Another feature of this invention pertains to the method of establishing intimate contact between the anodic film and the semiconductor by impregnating the filmed electrode with a solution which is convertible to a solid semiconductor in situ.

Still another feature of this invention lies in healing the dielectric film and then further impregnating the electrode.

A more complete understanding of this invention may be had by reference to the following detailed specification and the drawing in which.

Figure 1:
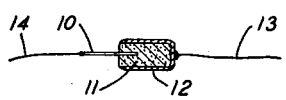
FIG. 1 is a diametrical sectional view of a cylindrical capacitor embodying this invention.

Referring now to FIG. 1, there may be seen an embodiment of this invention which includes a solid tantalum wire 10, one end of which is embedded in a porous body 11. Overlying the external surface of the completed unit is a conducting coating or casing 12, such as sprayed copper or melted-on lead-tin solder. A suitable lead 13 is attached, as by soldering, to the conducting coating 12.

A similar lead 14 is attached, as by welding, to the solid tantalum wire 10. The particular capacitor as shown in FIG. 1 is rated at 5 microfarads at 20 volts. It has a series resistance of between 1.5 and 5 ohms at 1,000 cycles and a leakage current of 0.0007 and 0.04 milliampere at 5 volts and 20 volts, respectively. The capacitor has a volume of approximately 0.01 cubic inch, and when coated with a dielectric lacquer requires no additional container or insulation.

Figure 2:
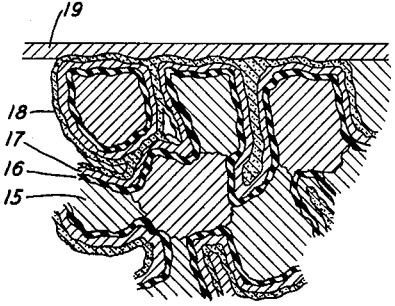
FIG. 2 is a magnified view of a fragmentary surface portion of the embodiment of FIG. 1.

Referring now to FIG. 2, the detailed composition of the porous body 11 of FIG. 1 may be seen. It includes a porous electrode 15 of a film forming metal. By film forming metal is meant a metal capable of electrolytically forming a dielectric film on its surface when made anodic in an electrolytic solution. This class of metals includes tantalum, aluminum, tungsten, columbium, hafnium, titanium, and zirconium. Upon the entire surface of the porous electrode 15, an electrolytically formed dielectric oxide film 16 is present. The film may vary in thickness up to 2,000 Angstrom units, the exact thickness being directly proportional to the voltage at which the dielectric film was formed. In this particular embodiment, the anodic film is in the order of 500 Angstrom units thick. The filmed porous electrode or anode is impregnated with a layer 17 of semiconductive material, such as the higher oxides of lead, nickel or manganese, in intimate contact with the film 16. Semiconductive materials which may be utilized successfully in carying out this invention are the semiconductive higher oxides of metals which may be deposited as the product of pyrolytic decomposition of a compound of the metal. The semiconductive material constitutes a solid electrolyte counter part of the liquid electrolyte of the conventional electrolytic capacitor.

The porous electrode 15, film 16, and semiconductive layer 17 are also impregnated with a deposit 18 of a good conducting material such as graphite, overlying the semiconductive layer 17. The deposit 18 of conducting material is the counter part of the cathodic element or can in the conventional electrolytic capacitor.

In order to facilitate electrical connection to the conducting deposit 18, a sprayed or melted-on metal casing 19 encompasses the major portion of the exterior of the porous body 11 in contact with the conducting deposit 18.

Figure 3:
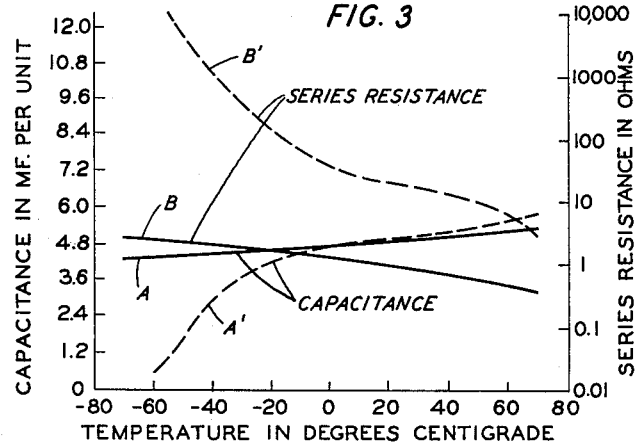
FIG. 3 is a graphical representation of the temperature characteristics of the capacitor in accordance with this invention.

Referring now to FIG. 3, a graphical representation may be seen of the capacitance and series resistance characteristics of a dry electrolytic capacitor unit constructed in accordance with this invention. The curve marked A depicts the variation of capacitance of a solid electrolytic capacitor in accordance with this invention, over the range from approximately −80° C. to +80° C. The capacitance variation with change in temperature approaches linearity throughout the entire range and the total variation is extremely slight. On the other hand, the capacitance of a conventional paste electrolytic capacitor suffers a marked falling off in the range below −20° C. as is shown by curve A'. Curve B illustrates the slight variation of series resistance of a capacitor constructed in accordance with this invention with respect to variation in temperature over a range of from substantially −80° C. to +80° C. The corresponding curve of the variation of the series resistance in a conventional 25-volt paste-type electrolytic capacitor over a similar range is shown in curve B'. The series resistance of the dry electrolytic capacitor of this invention is substantially linear throughout the range; and in contradistinction to the characteristic of conventional electrolytic capacitors, the increase in series resistance at low temperatures is slight. The adverse effect of low temperature upon the series resistance and the capacitance of conventional electrolytic capacitors has practically precluded their use in low temperature applications. There is no marked change in either of these characteristics in capacitors embodying this invention, thereby extending the useful range of temperatures for electrolytic capacitors.

Figure 4:
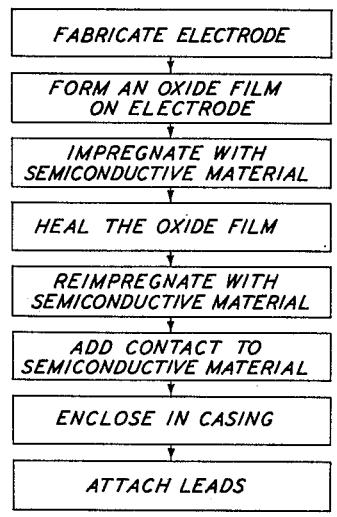
FIG. 4 is a diagrammatic representation of the method of this invention.

This solid electrolytic capacitor is manufactured by the method illustrated by the block diagram of FIG. 4. The porous electrode is produced by compressing and sintering particles of a film forming metal, for example tantalum, until they are bonded into a rigid porous mass. In the same step a solid wire of the same metal is bonded to the mass, with one end embedded within the porous body. An advantageous shape for the porous electrode is that of a cylinder. The porous electrode may be cleaned if necessary by any one of a number of conventional cleaning methods. The clean porous electrode is immersed in an electrolytic solution supported by the solid tantalum wire, through which a positive potential of, for example 30 volts, is applied for several hours. The electrolyte used may be either an aqueous solution or a fused salt electrolyte. A sheet of tantalum immersed in the solution is a suitable cathode. In order to obtain desirable high temperature electrical characteristics, it is highly advantageous to use a fused salt electrolyte which is maintained at a temperature high enough to assure the liquidity of the electrolytic solution and to readily anodize the electrode, but low enough to avoid the formation of a powdery oxide deposit instead of a uniform dielectric film. A fused salt electrolyte comprising the eutectic mixture of sodium nitrate and sodium nitrite in equal parts by weight, maintained at a temperature in the order of 250°, fulfills these requirements particularly well. Examples of other electrolytes are the mixtures of 64 percent potassium nitrate and 34 percent lithium nitrate by weight, and the mixture of 54 percent potassium nitrate, 30 percent lithium nitrate and 16 percent sodium nitrate by weight. Electrolytes used in carrying out this invention are oxygen providing salts or salt mixtures which are molten at a temperature well below that at which a powdery grey oxide of the anode material is formed. In the case of tantalum this temperature is in the order of 300° C.

Upon the passage of current through a porous tantalum electrode and the electrolyte, the anodic film of tantalum oxide ($Ta_2O_5$) is formed giving evidence of its physical presence by a brilliant interference color which changes as the film increases in thickness. Film formation is conducted in accordance with established electrolytic practice until a film of the desired voltage and leakage current characteristics has been obtained. A suitable method is to apply a potential of 30 volts until the leakage current drops off to a practical minimum.

After formation of the anodic film, the porous electrode is removed from the liquid electrolyte and immersed in an aqueous solution of manganous nitrate until the electrode is thoroughly impregnated with the solution. The solution impregnating the electrode is then pyrolytically converted at a temperature sufficient to decompose the manganous nitrate and convert it to manganese dioxide, e.g., 200–300° C. for a period of a few minutes or at least until all odor of nitrogen products is gone. The step of immersing in the manganous nitrate solution and converting it to manganese dioxide is repeated two or three times to insure a thorough impregnation. Upon subjection to the temperature required to convert the manganous nitrate to manganese dioxide, gaseous products including oxides of nitrogen are given off, leaving minute openings into the interior of the porous electrode assembly.

The electrode assembly, including the porous electrode 11, anodic film 16 and layer 17 of manganese dioxide in contact with the anodic film is then replaced in the fused salt bath and anodized again for in the order of one half the original forming time at approximately one half the original forming voltage. This step, anodically healing imperfections in the oxide film, reduces the leakage current to a point of usefulness for the capacitor. Commonly, this step results in a leakage current of less than 0.1 milliampere at 20 volts on a unit such as that pictured in FIG. 1.

The semiconductive oxide overlies the anodic film and is in contact with substantially all of the residual imperfections in that film. It is believed that a semiconductor such as manganese dioxide, when subjected to the high fields prevailing in the healing process, acts at its surface as an ionic conductor providing oxygen for film formation on either the film forming anode or impurities contained therein. The semiconductor in the process undergoes reduction at its surface to form an insulating barrier.

After the step of anodically healing imperfections, the electrode is further impregnated with manganous nitrate, which is then converted pyrolytically in the same manner as the previous impregnation to manganese dioxide. The second application of manganese dioxide not only thickens the coating of this semiconductor but also replaces these portions of the original coating which were reduced in the process of repairing residual flaws. The further impregnated electrode assembly is then impregnated with a conducting deposit, as by immersing the unit in an aqueous suspension of graphite, followed by air drying or heating of the unit to drive off the water. The assembly is then suspended from the solid tantalum wire, and a metal coating is sprayed or melted onto the cylindrical surface. Suitable leads are attached to the solid tantalum lead and the external casing. The solid tantalum lead of course must be electrically insulated from the external casing. The capacitor may be suitably finished by coating the surface with lacquer.

Figure 5:
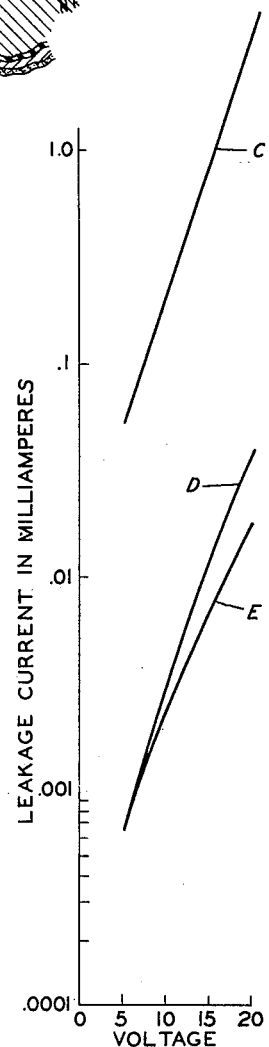
FIG. 5 is a graphical representation of the reduction in capacitor leakage current resultant from this invention.

Capacitors in accordance with this invention are constructed of dry essentially inorganic materials forming a compact rigid body of extremely high capacity per unit volume. The semiconductive material in intimate contact with the dielectric anodic film is an electronic conductor which is capable of reacting ionically at its surface as does the liquid electrolyte in a conventional electrolytic capacitor. The solid semiconducting layer is in intimate contact with the filmed anode similar to liquid electrolytes. In this solid electrolytic capacitor the healing of breaks in the anodic film is accomplished by subjecting the filmed anode impregnated with semiconductor to re-anodizing in a fused salt bath followed by re-impregnation with solid electrolyte. The step of healing the anodic film and re-impregnating with the semiconductive material includes in the manufacture certain of the characteristics of the conventional electrolytic capacitor, particularly, the ability to re-form breaks in the anodic film. In so doing, the semiconductive material also is capable of functioning as an electrolyte which supplies oxygen for the repair of imperfections in the oxide film. The effect of healing the anodic film and further impregnation with semiconductive material is apparent upon examination of FIG. 5. Curve C denotes the leakage current of a 5 microfarad capacitor prior to healing and re-impregnating. The leakage current ranging from approximately 0.06 to 1.0 in milliampere at voltages from 5 to 20 is above that allowable in commercially useful capacitors. However, upon healing and re-impregnating, the leakage current is reduced to values in the order of 0.0006 to 0.05 at 5 to 20 volts, as shown by curve D. An additional reduction in leakage current occurs upon aging of the capacitor or voltage after healing and re-impregnating, as shown by curve E. Healing of the anodic film and re-impregnation with semiconductor results in a solid dry capacitor which has a leakage current, capacitance and series resistance within useful ranges.

It is to be understood that the above-described arrangements are illustrative of the application of the principles of the invention. Numerous other arrangements may be devised by those skilled in the art without departing from the spirit and scope of the invention.

What is claimed is:

1. A capacitor comprising a body of compressed particles of a film forming metal, an electrolytically formed dielectric oxide film of the film forming metal over the exposed surface of each of said particles, a layer of manganese dioxide impregnating said body and in intimate contact with said dielectric film, a layer of graphite overlying said layer of manganese dioxide, a metal casing encompassing the major portion of said body insulated therefrom and in electrical contact with said layer of graphite, and electrical lead means attached to each said porous body and said casing.

2. An electrical capacitor comprising a sintered mass of particles of tantalum constituting a porous electrode, a substantially impervious dielectric film of tantalum oxide on the exposed portions of said particles, film maintaining means comprising a higher semiconductive oxide of manganese in intimate contact with said dielectric film, and conductive means constituting a second electrode in contact with said film maintaining means.

3. A capacitor comprising a body of compressed tantalum particles, an electrolytically formed tantalum oxide film over the exposed surfaces of each of said particles, a layer of manganese dioxide impregnating said body and in intimate contact with said tantalum oxide film, said manganese dioxide being reducible in the presence of high fields, said tantalum metal being oxidizable upon the reduction of the manganese dioxide, thereby healing imperfactions in the tantalum oxide film, a layer of graphite overlying said layer of manganese dioxide, a metal casing encompassing the major portion of said body, insulated therefrom and in electrical contact with said layer of graphite, and electrical lead means attached to each of said body and said casing.

4. An electrical capacitor comprising a sintered mass of tantalum particles constituting a porous first electrode of the capacitor, a substantially impervious dielectric film of tantalum oxide on the exposed portions of said particles, healing means comprising a semiconductive layer of manganese dioxide in intimate contact with said dielectric film, said manganese dioxide being reducible in the presence of high fields, said tantalum metal being oxidizable upon the reduction of the manganese dioxide, thereby healing imperfections in the tantalum oxide film, and conductive means constituting a second electrode of the capacitor in contact with said healing means.

5. A capacitor comprising a tantalum element constituting a first electrode of the capacitor, a tantalum oxide film over the surface of said element, a manganese dioxide coating over said oxide-filmed element, said manganese dioxide being reducible in the presence of high fields, said tantalum metal being oxidizable upon the reduction of manganese dioxide, thereby healing imperfactions in the tantalum oxide film, and conductive means in contact with the manganese dioxide coating and constituting the second electrode of the capacitor.

6. A capacitor in accordance with claim 5 characterized in that said conductive means comprises a graphite layer and the manganese dioxide coating is formed in situ by the pyrolytic decomposition of manganous nitrate.

References Cited by the Examiner

UNITED STATES PATENTS

| | | | |
|---|---|---|---|
| 1,238,660 | 8/17 | Field-Frank | 317—258 X |
| 1,621,058 | 3/27 | Burger | 317—258 |
| 1,906,691 | 5/33 | Lilienfeld | 317—230 |
| 1,925,307 | 9/33 | De Boer | 317—230 |
| 1,986,779 | 1/35 | Lilienfeld | 317—230 |
| 2,299,228 | 10/42 | Gray et al. | 29—25.31 X |
| 2,504,178 | 4/50 | Burnham | 317—230 |

FOREIGN PATENTS 519,132   3/40   Great Britain.

DAVID J. GALVIN, *Primary Examiner.*

SAMUEL BERNSTEIN, LLOYD McCOLLUM, WILLIAM W. DYER, JR., THOMAS E. BEALL,
*Examiners.*